United States Patent Office 3,756,836
Patented Sept. 4, 1973

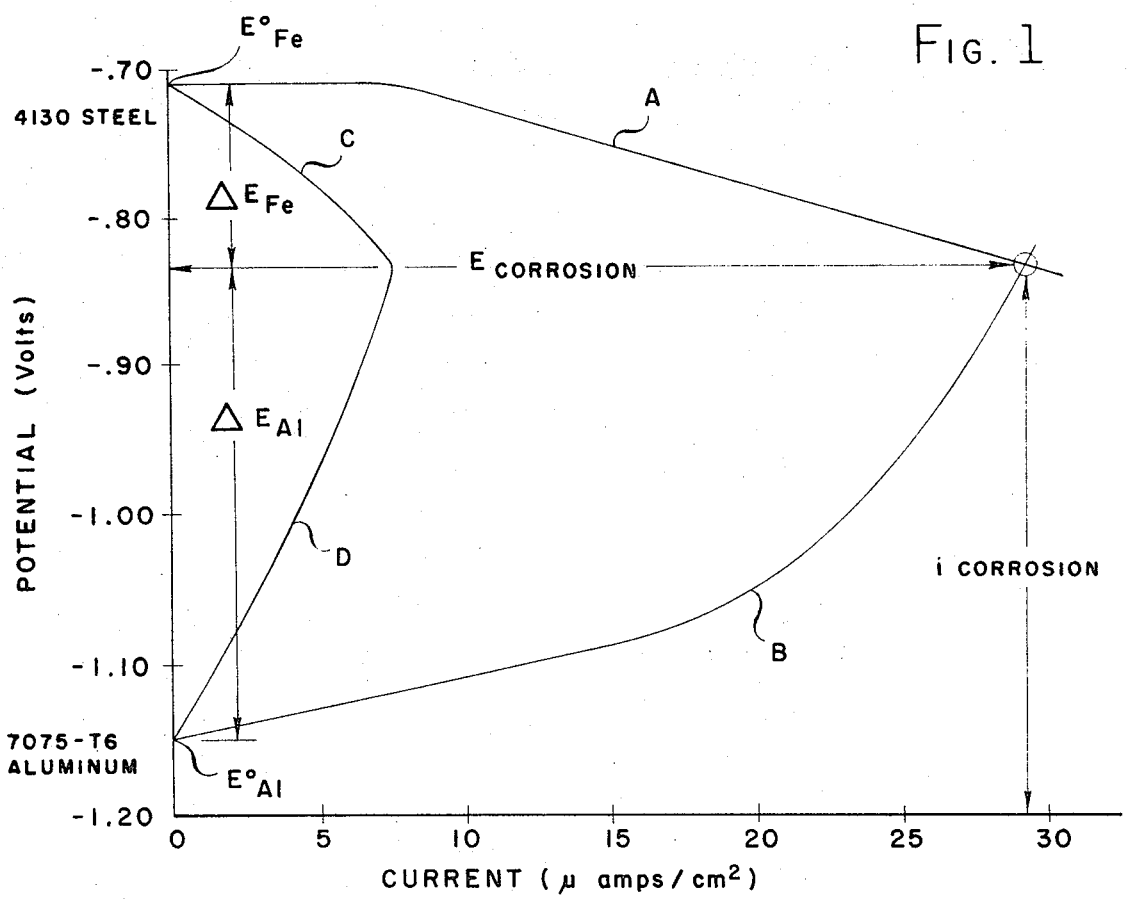
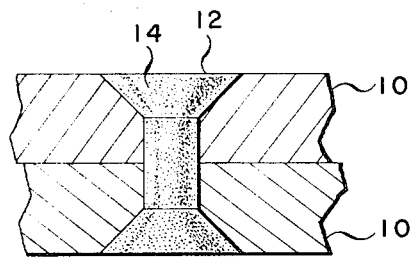
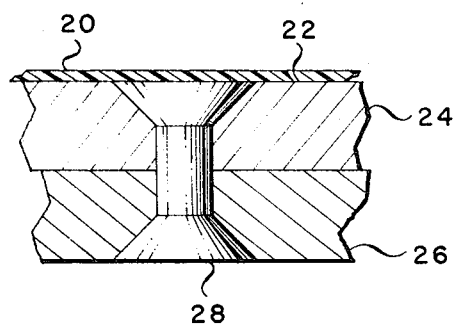
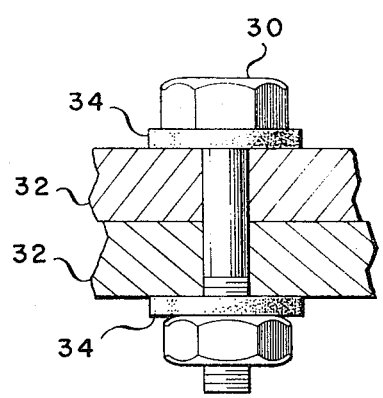

3,756,836
USE OF COBALT CHROMATES IN INHIBITING GALVANIC CORROSION
Kenneth E. Weber, Los Angeles, John L. Wanamaker, Burbank, and Marshall L. Ogne, Sagus, Calif., assignors to Lockheed Aircraft Corporation, Burbank, Calif.
Continuation-in-part of application Ser. No. 28,008, Apr. 13, 1970. This application Apr. 4, 1972, Ser. No. 240,994
Int. Cl. C09d 5/08
U.S. Cl. 106—14
18 Claims

ABSTRACT OF THE DISCLOSURE

Galvanic corrosion between iron and aluminum can be effectively controlled through the use of a cobalt chromate corrosion inhibitor in the areas where corrosion is anticipated betwen these two metals. Preferably the cobalt chromate used is dicobaltous oxychromate or a percobaltous oxychromate composition or a mixture of these. The cobalt chromate employed may be located directly between two parts of dissimilar metals within a carrier such as a conventional coating vehicle used between or to cover parts of dissimilar metals. Preferably such a carrier contains from 10 to 20% by weight of the cobalt chromate employed.

CROSS-REFERENCES TO RELATED APPLICATIONS

U.S. patent application entitled, "Production of Dicobaltous Oxychromate and Percobaltous Oxychromates" filed Mar. 30, 1970, Ser. No. 24,024 by Weber et al. which issued May 23, 1972, as U.S. Pat. 3,664,808.

Abandoned U.S. patent application entitled, "Coating Compositions for Corrosion Protection," filed Apr. 13, 1970, Ser. No. 28,009 by Weber et al.

This application is a continuation-in-part of the abandoned co-pending application entitled, "Use of Cobalt Chromates in Inhibiting Corrosion" filed Apr. 13, 1970, Ser. No. 28,008 by Kenneth E. Weber et al.

BACKGROUND OF THE INVENTION

In many different fields corrosion occurring as the result of galvanic coupling of two dissimilar metals is exceedingly detrimental. This can be illustrated in many different ways. In the aircraft field frequently aluminum and steel are utilized in contact with one another in locations where corrosion is apt to occur. Corrosion in these areas as a result of galvanic action will tend to detrimentally effect the parts formed of these materials. This may lead to a loss of strength or the like. In an aircraft, the possibility of part failure due to such corrosion can of course affect the utility of the entire aircraft.

In the past, this problem of corrosion as a result of galvanic coupling has been extensively recognized. Many different individuals and firms have extensively studied the corrosion resulting from galvanic coupling. As a result of these activities a number of different procedures have been developed for controlling corrosion between two different dissimilar metals.

One type of procedure which is frequently utilized involves locating a corrosion inhibitor type compound or composition in an area where corrosion is apt to occur. A number of different organic and inorganic compounds are used for this purpose. As an example of this inorganic compounds such as zinc chromate, various molybdates and nitrates have been utilized as corrosion inhibitors where galvanic coupling is apt to occur. To the degree that the action of such inhibitors is understood, it is best explained with reference to what occurs in a galvanic corrosion situation.

When the metals aluminum and iron are galvanically coupled, moisture must be present so as to serve as an electrolyte between these two metals. As a galvanic action between them occurs through the aid of the water acting as an electrolyte the aluminum acts as an anode while the iron acts as a cathode. At the iron cathode the water present will tend to be dissociated into hydrogen and hydroxyl ions. Also simultaneously the aluminum anode will be oxodized so as to form aluminum ions. The hydrogen gas will tend to accumulate on the iron and ultimately to be given off to the the adjacent atmosphere. While this occurs the aluminum and hydroxide ions will diffuse through the electrolyte solution so as to form the well-known aluminum hydroxide.

As this occurs the electrolyte will tend to become alkaline. However, such alkalinity is normally held at a comparatively minimum level because of absorption from carbon dioxide from the air by the electrolyte. This absorption results, of course in the formation of carbonic acid, a comparatively weak acid which tends to maintain the pH of the electrolyte in the principal area where the corrosion proceeds between the aluminum and the iron to approximately within the range of 6 to 8.5. The pH of the electrolyte present will vary within the system; the pH of the electrolyte in the area of the cathode being higher than within this range and the pH of the electrolyte in the area of the aluminum anode being lower than within this range.

It is considered that when an organic inhibitor is present within such a system that it will tend to minimize corrosion by a mechanism such as by forming a polarized film on the cathode or by forming a protective film on one or both of the metals in the couple by absorption or related phenomena. It will be realized that such film will tend to minimize the corrosion currents flowing within the liquid present serving as an electrolyte. By this mechanism, of course, the corrosion will be minimized since the amount of corrosion current flowing is directly related to the amount of metal which reacted at a surface where corrosion is occurring. Although to a degree effective, such organic inhibitors are not considered desirable from a utilitarian sense inasmuch as they are not of such a nature that they can be readily incorporated within many protective films or sealing compositions.

As a result of this it is generally desired to utilize inorganic inhibitors in the aircraft and related fields. Such inorganic compounds may be easily incorporated into various films and compositions in which they are held as a suspended phase in one or more other ingredients serving as a carrier. These inorganic compounds have generally been considered as either an anodic or cathodic depending upon which of the electrodes in a galvanic couple are primarily effected by their action. Oxidizing compounds such as chromates, molybdates and nitrates have been classified as anodic inhibitors because they will tend to stifle the anodic dissolution of a metal in a galvanic couple such as the aluminum-iron couple indicated in the preceding discussion. The precise mechanism by which this occurs is not completely understood. Theories have been advanced as to why this dissolution is inhibited or stifiled. It is possible to consider that in effect such anodic inhibitors serve essentially to produce a protective barrier on anodes which inhibit current flow.

The mechanism by which inhibitors classified as cathodic corrosion inhibitors function is also not completely understood. Inhibitors of this type such as those with a magnesium ion in them are considered to form an insoluble deposit such as a magnesium hydroxide film of the cathodic metal in a galvanic couple. The formation of such a deposit will tend to reduce the effective area of the cathode and/or to interpose material in the electrolyte adjacent to the cathode and in either event will tend to impede the flow of corrosion current. Such cathodic inhibitors undoubtedly act in a much more complex manner than is indicated by this simple statement.

The classification of inorganic galvanic corrosion inhibitors as anodic or cathodic is probably an over simplification of the precise mechanism by which these inhibitors work. It is considered that some inhibitors of an inorganic type for use in minimizing galvanic corrosion in fact exercise some action as both anodic and cathodic inhibitors even though they may be classified primarily as anodic or cathodic in nature. This classification of inorganic corrosion inhibitors as either anodic or cathodic depending upon the primary electrode reactions of such inhibitors is considered to evidence a failure of the known art to provide an adequate corrosion inhibitor.

Since corrosion in a galvanic couple such as the iron-aluminum couple involves two electrodes; the effective corrosion inhibitor for such a couple should be effective by causing both anodic and cathodic reactions with the specific metals of such a couple serving to stifle or minimize the flow of corrosion current. Different metals as may be encountered in galvanic couples react differently with different inorganic materials as may be used in inhibitors. Thus, an inhibitor which is effective as to a particular galvanic system cannot be expected to be as effective for use in another system as in the first, even though the other system is related to the first.

SUMMARY OF THE INVENTION

An objective of this invention is to teach the use of corrosion inhibitors which are particularly effective in minimizing corrosion in the galvanic couple iron and aluminum by virtue of the fact that these inhibitors effectively inhibit both anodic and cathodic reactions creating galvanic corrosion in such a couple. From this it will be apparent that the invention has as one of its primary objectives the provision of a type of corrosion inhibitor which is effective at both the aluminum anode and the iron cathode in an aluminum-iron couple system. In accordance with this invention effective corrosion inhibition can be achieved with other related galvanic couples, although the degree of corrosion inhibiting achieved with such other couples is not as great as that achieved with the iron-aluminum system.

A further objective of this invention is to provide a new and improved means for galvanic corrosion minimization or prevention using one or more cobalt chromate compounds as a corrosion inhibitor. Another objective of the present invention is to teach a method of using such a compound or such compounds in connection with the carrier phase so as to minimize corrosion at a comparatively nominal cost. A still further objective of this invention is to accomplish more effective corrosion protection in the galvanic couple iron and aluminum than has previously been achieved.

In accordance with this invention these and various related objectives are achieved as will be apparent in the remainder of this specification by the comparatively simple expedient of locating a cobalt chromate compound or mixture as hereinafter indicated between the metals in a galvanic couple in a region where corrosion is to be anticipated because they anticipate presence of moisture in this region. In accordance with this invention preferably the metals of such a couple are iron and aluminum, although corrosion protection can be obtained with other couples. If desired, a mixture of different cobalt chromates may be used in such a system to provide prolonged protection over an extended period of time. The cobalt chromates used should preferably be located in a carrier composition or phase so that they will be physically held in place and so that they may be contacted by moisture in order to facilitate their action in inhibiting corrosion.

BRIEF DESCRIPTION OF THE DRAWING

The invention is best more fully explained with reference to the accompanying drawing in which:

FIG. 1 shows polarization curves of an iron-aluminum couple with and without a corrosion inhibitor of the present invention;

FIG. 3 is a cross-sectional view showing one manner in which a corrosion inhibitor or inhibitor mixture of this invention may be used;

FIG. 4 is a cross-sectional view indicating another manner in which a corrosion inhibitor or mixture in accordance with this invention should be employed; and FIG. 5 is another cross-sectional view showing a further manner in which a corrosion inhibitor or mixture in accordance with this invention can be employed.

DETAILED DESCRIPTION

Figure 2:
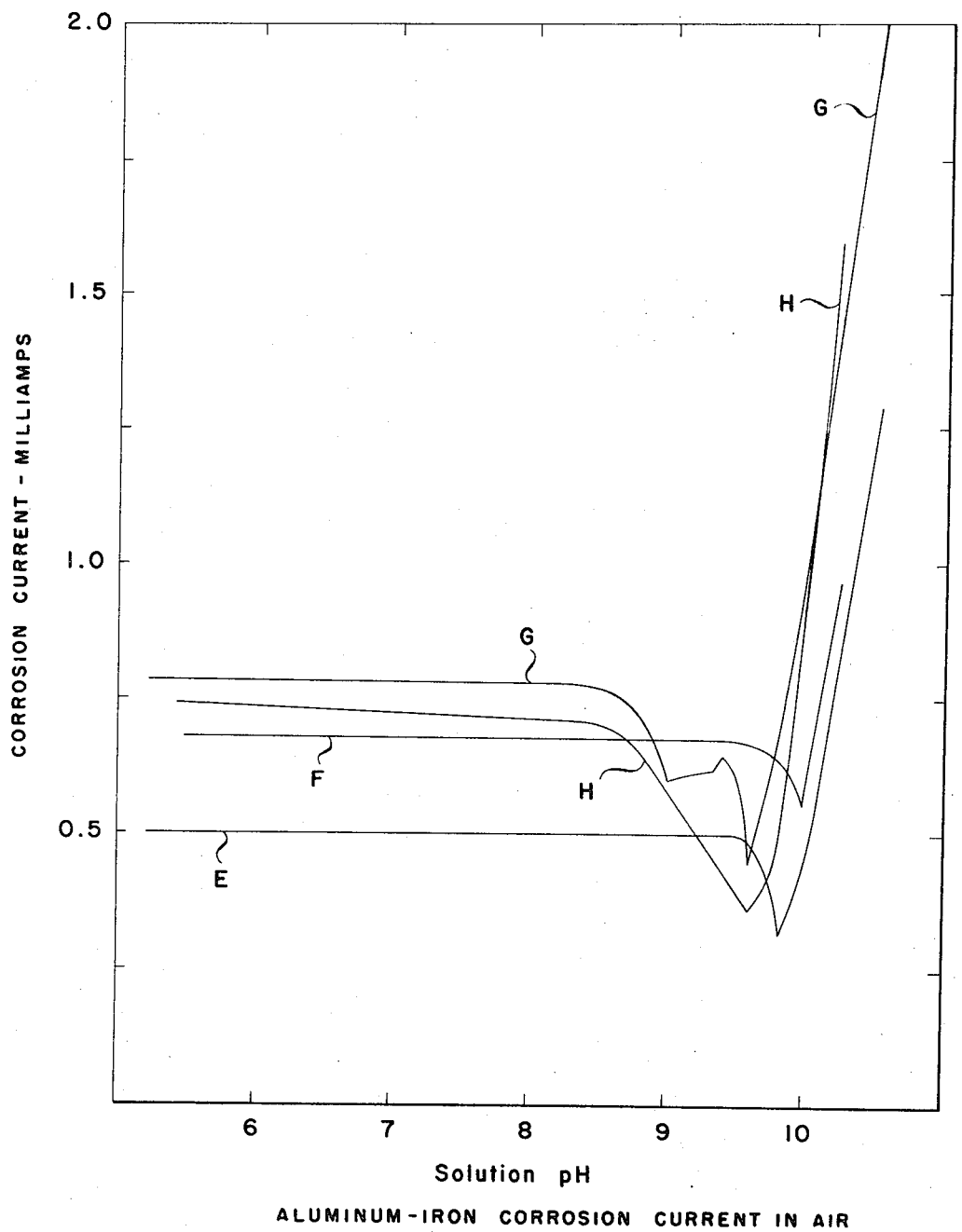
FIG. 2 is a set of curves showing corrosion current plotted versus pH for an iron-aluminum couple connected by various electrolytes.

The precise nature of an aqueous electrolyte composition which connects the electrodes in a galvanic couple subject to corrosion makes it extremely difficult if not impossible to accurately determine precisely what transpires in such a system. However, to a large degree this can be determined by simulating such a system under laboratory conditions and by considering that the value of corrosion current in such simulated laboratory condition is directly related to the rate of corrosion in such a system. In determining the nature of a galvanic couple subject to corrosion it is possible to connect the two metals of the couple in an electrolyte in connection with conventional equipment enabling the current flow between the two metals to be regulated.

In FIG. 1 of the drawing there are shown curves A and B obtained in this manner utilizing iron and aluminum electrodes connected by 1 M sodium chloride solution at a pH of 7. From the left-hand extremities of these curves A and B, it will be seen that both of these metals have negative open-circuit potentials when no current flow is permitted between them, the aluminum being more negative than the iron. As gradually increasing amounts of current are allowed to pass between these two metals the curve A for the iron will gradually become more negative while the curve B from the aluminum gradually becomes less negative.

At the point where these two curves A and B meet, the current value is the corrosion current of the iron and aluminum couple. This current is directly related to the amount of aluminum corrosion which will take place. The potential at this point may be referred to as the corrosion potential of this system. From an examination of the curves A and B and the point where they meet the amount of corrosion which may be anticipated in an iron-aluminum couple may be determined.

In accordance with this invention the shape of the curves A and B can be significantly altered by the use of a new electrolyte which differs from the electrolyte specified by the addition of 20 p.p.m. of dicobaltous oxychromate, a cobalt chromate inhibitor in accordance with this invention. When this is done, two additional curves C and D for the iron and aluminum are achieved. It will be noted that the curve C for the iron decreases more rapidly than the curve A and the curve D for the aluminum increases more rapidly than the curve B. Where these two curves meet, a completely different corrosion current value is manifested than is obtained with this invention. Because of such a lesser corrosion current obviously the amount of corrosion which can be expected in a system in which the metals iron and aluminum are connected using an inhibitor of this invention will be significantly decreased over that which can be anticipated if no corrosion inhibitor in accordance with the invention is utilized.

The effectiveness of a dicobaltous oxychromate as an inhibitor in the iron-aluminum system as compared with several other known inorganic inhibitors can be seen from an examination of FIG. 2 of the drawing. In this drawing, there are shown curves illustrating the corrosion currents in an iron-aluminum couple connected by various electrolytes saturated with air. The curve E shows the current in an electrolyte containing 20 p.p.m. of $2CoO \cdot CrO_3$ in 1 M NaCl; the curve F in an electrolyte containing 20 p.p.m. $ZnCrO_4$ in 1 M NaCl; the curve G in an electrolyte containing 20 p.p.m. $MgCrO_4$ in 1 M NaCl; and the curve H in 1 M NaCl electrolyte. These curves show the corrosion currents at various pH's obtained by adjusting the pH's of the electrolytes measured through the addition of sodium hydroxide and hydrochloric acid.

As indicated in the preceding discussion pertaining to the background of the invention generally the pH of the electrolyte or the water serving as an electrolyte during corrosion in an iron-aluminum couple will be within the range of from 6 to 8.5. As shown by FIG. 2 within this range the presence of a small amount of dicobaltous oxychromate effectively inhibits corrosion by lowering the corrosion current of the couple to a significantly greater extent than the corrosion current is lowered by other related corrosion inhibitor type compositions. It is noted that magnesium chromate, which is occasionally used as a corrosion inhibitor, actually increased the corrosion current beyond that obtained with the control 1 M sodium chloride electrolyte.

In service conditions a number of factors will affect the actual amount of corrosion taking place between two dissimilar metals of a galvanic couple. The amount of moisture present to connect such metals so as to serve as an electrolyte is of course one very important factor. Another is the conductivity of such a liquid. This will normally be influenced by a number of factors such as the proximity of an ocean and the possibility of the moisture containing some entrained or similarly present salt. The accessibility of the moisture connecting two different metals to the air will also tend to influence the amount of corrosion because of gases from within the air being present within the moisture.

The amount of corrosion occurring in a particular application will also be dependent upon a number of other factors. For example, if two iron bolts are utilized in contact with an aluminum member in an aircraft hull adjacent to, but spaced from one another in all probability there will be different amounts of corrosion caused by galvanic action at the two bolts caused by such factors as the manners in which the bolts are installed, the locations of the bolts influencing the moisture present between them and the aluminum member, the probability that the two bolts will probably be heated slightly differently as the aircraft hull is stored or operated or the like.

Because of these factors curves as indicated in FIGS. 1 and 2 of the drawings show what is regarded as a close approximation of the conditions which may exist at a galvanic couple subject to in use galvanic corrosion. These curves are considered to give a reasonable approximation of the effectiveness of a corrosion inhibitor because they show or are related to corrosion currents. According to the well-known laws of electrochemistry the weight changes in metal occurring as a result of galvanic corrosion are proportioned to the current flowing during the corrosion. Purely practical considerations are considered to make it nearly or probably impossible to accurately measure the weight changes in testing for corrosion inhibition with the accuracy with which corrosion inhibition can be effectively measured and determined using curves of the type of FIGS. 1 and 2. These curves are therefore considered to give a reasonable approximation of the effectiveness of corrosion inhibition in accordance with this invention.

Another indication as to the effectiveness of corrosion inhibition in accordance with this invention is given by the following Table I giving the results of tests conducted under identical conditions using identical equipment with a number of different compounds which are used as corrosion inhibitors and/or which have been suggested for use as possible corrosion inhibitors. This Table I pertains to a polarization method of evaluating such compounds utilizing as electrodes in a polarization cell 7075–T6 aluminum and 4130 steel so as to form a galvanic couple. In all cases the compounds were tested by utilizing the amounts indicated in a 1 M sodium chloride solution. All tests were made under an argon atmosphere.

This Table I is an abbreviated form of the complete table entitled "Table II" as set forth as an exhibit to the affidavit of Geraldine M Hoch in the aforenoted parent application Ser. No. 28,008. The entire Table II set forth as an exhibit to this affidavit has not been reproduced herein in the interest of brevity. Various different values given in this Table II which are omitted are considered to have significance in evaluating an inhibitor compound, but are considered to be less significant than the corrosion current value set forth in the following Table I, since the corrosion current in a galvanic couple is directly proportioned to the amount of corrosion as evidenced by weight loss occurring. The entire content of the Table II of the Geraldine M. Hoch affidavit in this co-pending application Ser. No. 28,008 is incorporated herein by reference for the purpose of supplementing this disclosure.

This effectiveness of galvanic corrosion inhibition in accordance with the invention cannot be completely explained at this time. It is, however, considered that a partial explanation is possible, and that the effectiveness of cobalt chromate inhibitors in accordance with this invention is related to the ability of cobalt chromate compounds to release

TABLE I

| Compound | Concentration. p.p.m. | Icor./A. micro₂ AMPs/cm.² |
|---|---|---|
| NaCl control | 10 | 11.7 |
| Na₂CrO₄ | 10 | 11.7 |
| Na₂CrO₄ | 110 | 11.8 |
| Na₂MoO₄ | 20 | 12.4 |
| Na₃VO₄ | 20 | 10.5 |
| MgCrO₄ | 14 | 37.5 |
| MgMoO₄ | 18 | 54.5 |
| SrCrO₄ | Sat. | 7.5 |
| ZnCl₂ | 20 | 31 |
| ZnCrO₄ | Sat. | 10.9 |
| ZnMoO₄ | Sat. | 24.8 |
| CdCrO₄ | Sat. | 7.5 |
| CdMoO₄ | Sat. | 22.3 |
| Cd₃(VO₄)₂ | 20 | 17.1 |
| PbCrO₄ | Sat. | 12.9 |
| PbMoO₄ | Sat. | 27.3 |
| SnCl₄ | 20 | 24.8 |
| Sn(CrO₄)₂ | 100 | 19.1 |

TABLE II

| Compound | Concentration. p.p.m. | Icor./A. micro₂ AMPs/cm.₂ |
|---|---|---|
| 2CoO·CrO₃ | Sat. | 7.1 |
| CoMoO₄ | Sat. | 45 |
| Co₃(VO₄)₂ | Sat. | 45 |
| NiCrO₄ | Sat. | 29.8 |
| NiMoO₄ | 22 | 45 | in an aqueous electrolyte chromate ions which specifically react at the aluminum anode in an iron-aluminum couple so as to inhibit corrosion current at the aluminum surface. Such reactions are considered to be relatively more effective between aluminum and the chromate ion than with the chromate ion and other metals. They are considered to involve the formation of various unknown complexes such as aluminum will on occasion form.

The effectiveness of cobalt chromate inhibitors in accordance with this invention is also considered to be related to the ability of this type of inhibitor to release an active cobalt complex of unknown composition which effectively polarizes the surface of the iron cathode in a couple as described. The close relationship between iron and cobalt in the Periodic Table is well-known. It is possible that the cobalt interreacts with the iron at the iron surface forming compounds analogous to ferrites which effectively coat or cover the iron surface as corrosion progresses so as to offer resistance to the flow of corrosion current.

Probably this is achieved along with the formation of complexes with those ions present in the electrolyte and somewhat removed from the electrode surfaces. As this action is achieved, unquestionably some of the cobaltous chromate and percobaltous oxychromates will continue to pass into solution as various ions because of the solubility of these compounds in an acidic solution such as will be created in at least parts of the electrolyte by absorption of carbon dioxide from air or other manners.

Because of the solubility of cobaltous chromate in an acidic solution this known compound can be effectively utilized as a corrosion inhibitor in the same manner as dicobaltous oxychromate. It will provide in a solution the same ions as dicobaltous oxychromate. Similarly, the percobaltous oxychromates may be effectively used as a corrosion inhibitor because they also will tend to pass into solution in an acidic solution so as to yield these ions. This latter compound will, however, pass into solution by a mechanism similar to that encountered with dicobaltous oxychromate, breaking down into constituent ions and oxides as they pass into solution. All three of these compositions will tend to go into solution at different rates because of their different solubilities.

This is considered significant with the present invention. In the use of a corrosion inhibitor it is desired to provide corrosion protection over as long a period as reasonably possible. Since corrosion protection with a corrosion inhibitor is dependent upon solubility, a specific cobalt chromate such as cobaltous chromate, dicobaltous oxychromate or a specific percobaltous oxychromate will only provide efficient protection over the period it takes for such a compound or composition to go into solution in the area at a galvanic couple where corrosion takes place. Such a time interval will not be a fixed interval but will be depended upon a number of factors such as how the cobalt chromate is located in such an area, the rate and manner at which moisture reaches such an area and the like.

As a result of these factors it is considered preferable to use a mixture of cobalt chromates as corrosion inhibitors in accordance with this invention. A mixture of these various cobalt chromates can conveniently be prepared as indicated in the aforenoted U.S. patent application entitled, "Production of Dicobaltous Oxychromate and Percobaltous Oxychromates." It is considered that mixtures containing approximately equal proportions of the dicobaltous oxychromate and the percobaltous oxychromates as are prepared by increasing the pH of a chromic acid solution by the addition of cobalt hydroxide to within the alkaline range as described in this co-pending application are particularly effective in providing comparatively long term protections. In the interest of brevity the entire disclosure of this co-pending application entitled, "Production of Dicobaltous Oxychromate and Percobaltous Oxychromates" is incorporated herein by reference.

Inasmuch as the cobalt chromates useable as inhibitors in accordance with this invention are solids it is necessary to utilize them in such a manner that they will be maintained in an area where corrosion is apt to occur. This may be accomplished in some instances by using physical means such as a retainer to capture or hold a cobalt chromate alone, in the absence of a binder or carrier, in an area between two metals of a galvanic couple. However, for most applications this is best accomplished by disposing a cobalt chromate or cobalt chromate mixture as herein described in an appropriate carrier so that the cobalt chromate or mixture is carried as a suspended phase in such a composition.

These concepts are all related to one important consideration relative to the invention. The effectiveness of cobalt chromate or cobalt chromate mixtures described in inhibiting galvanic corrosion is related to the mere physical presence of inhibitor or inhibitor mixture as indicated in an area where galvanic corrosion may occur as the result of even a trace amount of moisture between two metals. Thus, the use of inhibitors in accordance with this invention is not dependent upon the usual quantitative considerations such as are involved in the normal chemical situation.

The action of an inhibitor as described is dependent upon the location of the inhibitor or mixture as described in the region generally between two dissimilar metals where such an inhibitor or mixture will be contacted by any moisture which might tend to connect these metals. Obviously, the finer the inhibitor mixture is divided up and disbursed in this region the more pronounced the degree of protection accorded. For this reason, it is considered preferable that an inhibitor or mixture as described be utilized in the form of a finely divided powder at least of a −100 mesh standard Tyler screen size. It is considered, however, that for best results that this powder be at least −325 mesh standard Tyler screen size.

One manner in which such a powder may be utilized is indicated in FIG. 3 of the drawing. Here there are shown two aluminum plates 10 secured together by a conventional steel rivet or similar fastener 12, the surface of which is covered by a coating 14 of a finely divided cobalt chromate or cobalt chromate mixture as herein indicated. In this specific structure mere physical forces holding the rivet 12 in place serve to hold the inhibitor or mixture in place between the plates 10 and the rivet 12 so that it will serve to inhibit any galvanic corrosion between the rivets 12 and the plates 10. If desired, the inhibitor or mixture in this structure may be held in place by an appropriate coating composition serving as a binder to physically stabilize the particles of such an inhibitor or mixture and to further guard against galvanic corrosion by tending to physically block or hold out moisture.

Appropriate coating compositions useful in holding cobalt chromate or mixtures in accordance with this invention may utilize many different known ingredients. In general any type of a composition useful in creating protective coatings, may be employed. Thus, various known polyamide resins, polyamine resins, nitrocellulose resins, polyurethane resins, polysulfide resins, phenolic resins, epoxy resins, acrylic resins, polyesters and the like can be compounded to contain a cobalt chromate or cobalt mixture so as to be useful in corrosion protection.

Further, as indicated in the co-pending application entitled, "Coating Composition for Corrosion Protection" a cobalt chromate or cobalt chromate mixture may be formulated with a drying or a semi-drying or similar fluid so as to provide a paint type composition in which the cobalt chromate will act as a dryer so as to facilitate film formation. The entire disclosure of this co-pending application is incorporated herein by reference. Cobalt chromates as herein described may even be compounded into various synthetic rubber type materials useful as gaskets so as to provide corrosion protection.

In all of such applications or uses of cobalt chromate it is considered that the composition employed should contain at least 0.5% by weight of a cobalt chromate or a cobalt chromate mixture, and preferably at least 10% by weight of such a compound or mixture in order to provide adequate inhibitors for efficient corrosion protection. It is considered that the use of more than 20% by weight of such a compound or mixture is disadvantageous in a composition as described for two reasons: in general an excess of this amount of cobalt chromate is not normally needed to provide adequate corrosion protection and an excess of this amount of material may tend to unnecessarily weaken or lessen the physical properties of the carrier or binder composition. Thus, for example, if a carrier composition contains too great of a proportion of cobalt chromate it may not have the physical strength necessary to resist abrasion or it may not have the necessary adhesion so that it will not adhere to areas to be protected against corrosion.

Proportions of cobalt chromate within the ranges indicated can easily be incorporated within known types of compositions in accordance with conventional techniques. It is considered that in incorporating these inhibitors that they should be treated generally as pigments or fillers. If they are to be used with known formulations the proportions of solid ingredients in such compositions should normally be reduced in accordance with the amount of a cobalt chromate or cobalt mixture used.

A degree of corrosion protection will be achieved in any such composition regardless of whether or not the cobalt chromate ingredients are completely covered or encased within the carrier used. It is normally preferred to utilize a cobalt chromate as herein described in a composition which is above the so-called critical pigment concentration of such a composition so that some of the cobalt chromate present will be exposed to ambient moisture without difficulty so that it can readily function as a corrosion inhibitor. On the other hand, cobalt chromate corrosion inhibitors as herein described will normally function in their intended manner even when completely encased in a carrier phase because of the gradual entrance of moisture into the usual coating.

Such an inhibitor or inhibitor composition may be incorporated in amounts by weight as indicated into many different compositions which are not even coating compositions. As an example of this, reference is made to FIG. 5 of the drawing showing a conventional steel bolt 30 used in holding two aluminum plates 32 to one another. In this utilization a cobalt chromate inhibitor or inhibitor composition of the present invention is incorporated into natural or synthetic rubber washers 34 used between the fastener 30 and the plates 32 at the exposed surfaces of these plates 32. These washers 34 serve to protect against galvanic corrosion between the fastener 30 and the plates 32 by blocking the ingress of moisture to between the fastener 30 and the plates 32 and by physically locating an inhibitor or inhibitor mixture as described in the areas where such moisture might penetrate the space between the fastener 30 and the plates 32.

Many different suitable natural and synthetic rubbers can be utilized. For example, a conventional polysulfide polymer formula containing parts by weight the following Type FA polysulfide rubber—100; ZnO—10; stearic acid—0.50; benzothiazyl disulfide—0.30; and diphenylguanidine—0.10; and carbon black—40 can be formulated so as to contain from 0.5% by weight up to in excess of 20% by weight dicobaltous oxychromate or another chromate or mixture as indicated in the specification. In order to provide protection against galvanic corrosion, it is considered that the composition should contain at least 10% by weight of such an inhibitor or mixture.

Similar amounts of an inhibitor or mixture can readily be incorporated within a large number of other known natural or synthetic rubber compositions. As an example of this, a "basic" neoprene (polychloroprene) rubber mixture consisting of 100 parts by weight type "W" neoprene, 1 part by weight phenyl-beta-naphthyl amine, 4 parts by weight magnesium oxide and 5 parts by weight zinc oxide, ½ part by weight imidazoline accelerator can be compounded with a cobalt chromate or mixture as herein described used as a filler so that the ultimate composition will contain from at least 0.5% by weight of the inhibitor or inhibitor mixture and in an amount by weight of not to exceed 20% by weight of the composition without detrimentally effecting the properties of the neoprene as a sealant in a washer.

Care should be taken in the use of cobalt chromates and cobalt chromate mixtures as herein described in coating compositions which are based upon drying oils since it is well-known that the cobalt within compounds such as cobalt naphthenate will cause such compositions to tend to set up or dry. Thus, when an inhibitor or an inhibitor composition as herein described is used in an established type of a paint formulation, the formulation should omit the conventional dryer and preferably should be compounded so that it will not dry or set up rapidly by conventional means known to the industry such as by utilizing an excess of a solvent. By coating the individual particles of an inhibitor or inhibitor mixture as indicated by a protective coating, such as the coating of a lacquer as indicated in the preceding discussion, coatings as described can be directly incorporated into conventional paints in proportions as indicated. Such coated particles can be manufactured by using a lacquer or varnish composition as described in the preceding and drying it in air so as to produce a solid residue which is ground prior to use in a paint.

The effectiveness of cobalt chromates and mixtures as dryers in connection with semi-drying oils forms the subject matter of the indicated co-pending application entitled, "Coating Compositions for Corrosion Protection." When inhibitors as herein described are mixed with semi-drying oils as indicated in this co-pending application they act as dryers for such oils. This is considered to enable semi-drying oils that are less expensive than drying oils to be utilized in paint and paint-type compositions which are valuable apart from the fact that coatings providing protection against galvanic corrosion can be obtained from such compositions.

It is not to be inferred from the preceding discussion that the various manners of use of corrosion inhibitors in accordance with this invention are exclusive from one another. Corrosion inhibitors and mixtures as herein described can be employed in the same generalized areas in different manners as for example, by being physically held in such areas without a binder, by being supported in such areas on a washer or washer-like member and by having such areas then coated with a protective coating such as a varnish or a lacquer or a paint containing such a corrosion inhibiting composition.

From a detailed consideration of this specification it can be realized that the use of a cobalt chromate compound or mixture as herein described is effective in corrosion minimization or protection with iron-aluminum corrosion systems or couples. These cobalt chromates are useful in providing such protection with other galvanic couples than the iron-aluminum couple, but are not considered to offer the degree of protection achieved with the iron-aluminum system when used with other dissimilar metals.

We claim:

1. A method of inhibiting galvanic corrosion between two dissimilar metals which are subject to galvanic corrosion which consists essentially of:
   placing an effective amount to inhibit galvanic corrosion of cobalt chromate particles of a material selected from the group consisting of cobaltous chromate, dicobaltous oxychromate, percobaltous oxychromate having the formula $xCoO.CrO_3$ in which $x$ is greater than 2 and mixtures thereof between said metals in a region where galvanic corrosion is anticipated.

2. A method as claimed in claim 1 wherein: said metals are aluminum and iron.

3. A method as claimed in claim 1 wherein:
   said cobalt chromate particles are cobaltous chromate particles.

4. A method as claimed in claim 1 wherein:
said cobalt chromate particles are dicobaltous oxychromate particles.

5. A method as claimed in claim 1 wherein:
said cobalt chromate particles are particles of a percobaltous oxychromate composition having the formula $xCoO.CrO_3$ in which $x$ is greater than 2.

6. A method as claimed in claim 1 wherein:
said cobalt chromate particles are particles of a mixture of cobalt chromates.

7. A method as claimed in claim 1 wherein:
said cobalt chromate particles are particles of a mixture of dicobaltous oxychromate and percobaltous oxychromate having the formula $xCoO.CrO_3$ in which $x$ is greater than 2.

8. A method as claimed in claim 1 wherein:
said cobalt chromate particles are located in an inert carrier for holding said particles physically in place at the site of anticipated galvanic corrosion, said carrier containing at least 0.5% and up to 20% by weight of said cobalt chromate particles.

9. A method as claimed in claim 1 wherein:
said cobalt chromate particles are located in an inert carrier for holding said particles, said carrier containing from about 10 to about 20% by weight of said cobalt chromate particles.

10. A method as claimed in claim 1 wherein:
said metals are iron and aluminum,
said cobalt chromate particles are located in an inert carrier for holding said particles, said carrier containing from about 10 to about 20% by weight of said cobalt chromate particles.

11. A method as claimed in claim 10 wherein:
said cobalt chromate particles are particles of a mixture of cobalt chromates.

12. A method as claimed in claim 10 wherein:
said cobalt chromate particles are particles of a mixture of equal parts by weight of dicobaltous oxychromate and percobaltous oxychromates having the formula $xCoO \cdot CrO_3$ in which $x$ is a greater than 2.

13. A composition of matter useful in inhibiting galvanic corrosion between two dissimilar metals subject to galvanic corrosion which consists essentially of:
cobalt chromate particles of a material selected from the group consisting of cobaltous chromate, dicobaltous oxychromate, percobaltous oxychromate having the formula $xCoO \cdot CrO_3$ in which $x$ is greater than 2 and mixtures thereof located in an inert organic carrier compositon for holding said particles physically in place at the site of anticipated galvanic corrosion as a carried phase;
said cobalt chromate composition being present in an amount of from 0.5 to 20% by weight of the entire weight of said composition;
said cobalt chromate composition consisting of finely ground particles of a −100 mesh standard Tyler screen size.

14. A composition of matter as claimed in claim 13 wherein:
said cobalt chromate particles are cobaltous chromate particles.

15. A composition of matter as claimed in claim 13 wherein:
said cobalt chromate particles are dicabaltous oxychromate particles.

16. A composition of matter as claimed in claim 13 wherein:
said cobalt chromate particles are particles of a percobaltous oxychromate composition having the formula $xCoO \cdot CrO_3$ in which $x$ is greater than 2.

17. A composition of matter as claimed in claim 13 wherein:
said cobalt chromate particles are particles of a mixture of cobalt chromates.

18. A composition of matter as claimed in claim 13 wherein:
said cobalt chromate particles are particles of a mixture of dicobaltous oxychromate and a percobaltous oxychromate composition having the formula $$xCoO \cdot CrO_3$$

in which $x$ is greater than 2.

References Cited
UNITED STATES PATENTS

| | | | |
|---|---|---|---|
| 3,351,421 | 11/1967 | Boggs et al. | 252—387 |
| 3,498,926 | 3/1970 | Boggs | 252—387 |
| 2,573,738 | 11/1951 | Smith et al. | 23—56 X |

JOSEPH L. SCHOFER, Primary Examiner

D. A. JACKSON, Assistant Examiner

U.S. Cl. X.R.

106—310; 148—6.2; 252—387